US008105708B2

(12) United States Patent
Rudorff et al.

(10) Patent No.: US 8,105,708 B2
(45) Date of Patent: Jan. 31, 2012

(54) HEAT EXCHANGER FOR AN ENERGY STORAGE DEVICE

(75) Inventors: Axel Rudorff, Berlin (DE); Nevzat Guener, Berlin (DE)

(73) Assignee: TEMIC Automotive Electric Motors GmbH, Berlin (DE)

( * ) Notice: Subject to any disclaimer, the term of this patent is extended or adjusted under 35 U.S.C. 154(b) by 651 days.

(21) Appl. No.: 12/226,539

(22) PCT Filed: Dec. 13, 2006

(86) PCT No.: PCT/DE2006/002222
§ 371 (c)(1),
(2), (4) Date: Oct. 20, 2008

(87) PCT Pub. No.: WO2007/118437
PCT Pub. Date: Oct. 25, 2007

(65) Prior Publication Data
US 2009/0075158 A1 Mar. 19, 2009

(30) Foreign Application Priority Data
Apr. 19, 2006 (DE) .......................... 10 2006 018 329

(51) Int. Cl.
*H01M 2/12* (2006.01)
*H01M 10/50* (2006.01)
(52) U.S. Cl. ............................. 429/53; 429/56; 429/120
(58) Field of Classification Search .................. 429/53, 429/54, 120, 56; 165/169
See application file for complete search history.

(56) References Cited

U.S. PATENT DOCUMENTS

| 4,206,312 | A  | * | 6/1980  | Kuhlmann ............... 165/169 X |
| 5,158,841 | A  |   | 10/1992 | Mennicke et al. |
| 7,112,387 | B2 | * | 9/2006  | Kimoto et al. ............ 429/120 X |
| 7,261,974 | B2 | * | 8/2007  | Watanabe et al. ............ 429/120 |
| 2005/0255379 | A1 | | 11/2005 | Marchio et al. |

FOREIGN PATENT DOCUMENTS

| DE | 90 11 893      | 10/1990 |
| EP | 0 454 017      | 10/1991 |
| EP | 1 011 156      | 6/2000  |
| WO | WO 99/05746    | 2/1999  |
| WO | WO 2006/108529 | 10/2006 |

OTHER PUBLICATIONS

English translation of PCT International Preliminary Report on Patentability, PCT/DE2006/002222, issued Dec. 24, 2008.

* cited by examiner

*Primary Examiner* — Stephen J. Kalafut
(74) *Attorney, Agent, or Firm* — W. F. Fasse; W. G. Fasse

(57) ABSTRACT

A heat exchanger is connected to at least one energy storage cell of an energy storage device in a heat-conducting manner. The energy storage device is enclosed by a housing. The energy storage cells have at least one safety pressure release valve or burst opening for the release of gases to the outer environment. The heat exchanger at least partially forms at least one side of the housing and has holes that connect the safety pressure releases of the energy storage cells with the environment.

20 Claims, 2 Drawing Sheets

HEAT EXCHANGER FOR AN ENERGY STORAGE DEVICE

FIELD OF THE INVENTION

The invention relates to a heat exchanger for an energy storage device, which is built into a vehicle, preferably a hybrid-driven vehicle. A hybrid vehicle is a vehicle, in which different drive concepts are combined; usually an internal-combustion engine is combined with an electrical machine.

BACKGROUND INFORMATION

The electrical machine is usually embodied as a starter/generator and/or as an electrical drive. As a generator it enables a recuperation of the brake energy, i.e. the kinetic energy of the vehicle is transformed by the generator into electric energy which is then stored. The function of the electrical machine as a starter makes it possible to start the combustion engine. Use of the electrical machine as an additional drive provides an additional torque, e.g. to accelerate the vehicle or for the pure electrical drive of the vehicle. Furthermore, hybrid vehicles comprise at least one electronics arrangement for controlling the energy flow and an energy storage device.

The energy storage device consists of a series connection of energy storage cells and of further electronic components. The energy storage cells are usually installed together with the control electronics in a closed housing inside the vehicle. For dissipating gases possibly escaping from the energy storage cells the housing is provided with a defined opening or leakage. Due to the high powers of an electrical machine in a hybrid drive a high lost heat to be dissipated is produced among others in the energy storage device, which lost heat is systematically transported outwards via heat exchangers, which are installed between the energy storage cells, and/or is dissipated by circulating air.

It is disadvantageous with such an embodiment that in particular when mounting the energy storage device outside of the passenger compartment, in the event of a failure it turns out to be difficult to dissipate the gases escaping from the energy storage cells, since on the one hand here high demands are exacted to the tightness of the housing, in order to keep soil and humidity away from the battery cells, and on the other hand the housing must comprise a certain leakage for gas dissipation and/or for dissipation of possibly arising condensation water. The demanded tightness contradicts the demanded dissipation of unwanted gases or liquids.

A further disadvantage is the previously usual arrangement of the heat exchangers between the energy storage cells for dissipating the lost heat, as it is shown e.g. in DE 90 11 893 U1. The volume of the energy storage device is increased by such an arrangement, what is unwanted due to the continuously increasing lack of space in particular when installing it into a motor vehicle. Renouncing of these heat exchangers and a cooling exclusively by circulating air, however, is out of question due to the high lost heat in the energy storage cells and the air cooling insufficient for this purpose.

SUMMARY OF THE INVENTION

It is the object of the invention to avoid the two above-mentioned disadvantages of the state of the art and to provide a compact energy storage device, which housing fulfills the tightness demanded for being arranged outside of the passenger compartment and which simultaneously permits to dissipate outwards gases and/or liquids escaping in the case of failure.

The solution according to the invention provides that the heat exchanger forms at least partially at least one housing side and that the heat exchanger comprises holes, which serve to connect the safety pressure release valves or burst openings of the energy storage cells with the housing environment.

By the solution according to invention the function of the heat exchanger is extended by integrating several functions of the housing while simultaneously reducing the components.

The heat exchanger is embodied as a supporting part of the housing, what allows on the one hand for saving a housing wall and on the other hand for renouncing on a heat exchanger arranged inside the housing. This helps to reduce the components of the energy storage device and contributes to a more compact construction, as the energy storage cells can be arranged more closely by eliminating the heat exchangers arranged in their clearances. In addition, the assembly expenditure is reduced.

The holes in the heat exchanger allow for a dissipation of the gases which may escape from the safety pressure release valves of the energy storage cells into the environment. If the safety pressure release valves of the energy storage cells open, escaping gases are systematically dissipated outwards through the holes in the heat exchanger. This prevents an uncontrolled overpressure with a risk of explosion inside the storage and a damage of additionally installed electronics. For this reason the housing can be completely sealed, further reducing the risk of contaminating the energy storage cells or the electronic unit by soil or liquid intruding into the housing. The defined opening or leakage common in the state of the art can be omitted.

Preferably, the energy storage cells are fastened at the heat exchanger, so that the heat exchanger does not only absorb the heat radiation emanating from the energy storage cells, but to allow for direct heat transfer from the energy storage cells to the heat exchanger. Fastening the energy storage cells can be effected by indirectly pushing them into a housing fastened e.g. to the heat exchanger or also by means of sealing compound, which preferably has a high thermal conductivity and/or is electrically insulating.

In a preferred embodiment the safety pressure release valves are arranged at an axial end of the energy storage cell and the energy storage cell is fastened to the heat exchanger in such a manner that the safety pressure release valves rest directly at the holes in the heat exchanger. Hereby, escaping gases from the energy storage cells are delivered directly from the safety pressure release valves into the environment, without having to lead them at first inside the housing towards outside e.g. by a hose or pipe connection. This reduces the assembly expenditure and the susceptibility to interference.

The holes are preferably smaller than the diameter of the energy storage cells, so that merely the axial end of the energy storage cells provided with the safety pressure release valves is connected with the environment. A sealing between the surface of the energy storage cells and the heat exchanger—either from the inside or from the outside—ensures that no ambient air can reach through the holes the interior of the housing.

As the electronic module requires similar site conditions as the energy storage cells for controlling the energy flow of the energy storage device—i.e. as little soil as possible and as high heat dissipation as possible—it is appropriate to likewise locate the electronic module inside the housing and to connect it with the heat exchanger.

It can be furthermore provided to cast the energy storage cells completely in a sealing compound. This has the advantage that the bottom of the cell connected with the heat exchanger is the coldest place at the energy storage cells. Since condensation water always forms at the coldest place, the dew point, i.e. the temperature range, in which air condenses, shifts to the bottom of the cell; preferably into that range, which is connected via the holes with the environment. Since this range lies far away from the sensitive electronics, the latter is protected against the condensation water.

Cooling agent of the heat exchanger is preferably cooling fluid, which flows through the heat exchanger. Air is also applicable as a cooling agent, which, however, is less suitable for the high lost heat due to the smaller heat absorption. Also a cooling by means of expanding gases or liquids, as it is used already in the state of the art, is possible with the heat exchanger according to invention; however, its implementation is more complex than a pure liquid cooling, for which reason the liquid cooling is to be preferred.

BRIEF DESCRIPTION OF THE DRAWINGS

Further features, advantages and advantageous embodiments of the invention will become apparent from the following description of the invention on the basis of the drawings, in which.

DETAILED DESCRIPTION OF EXAMPLE EMBODIMENTS OF THE INVENTION

Figure 1:
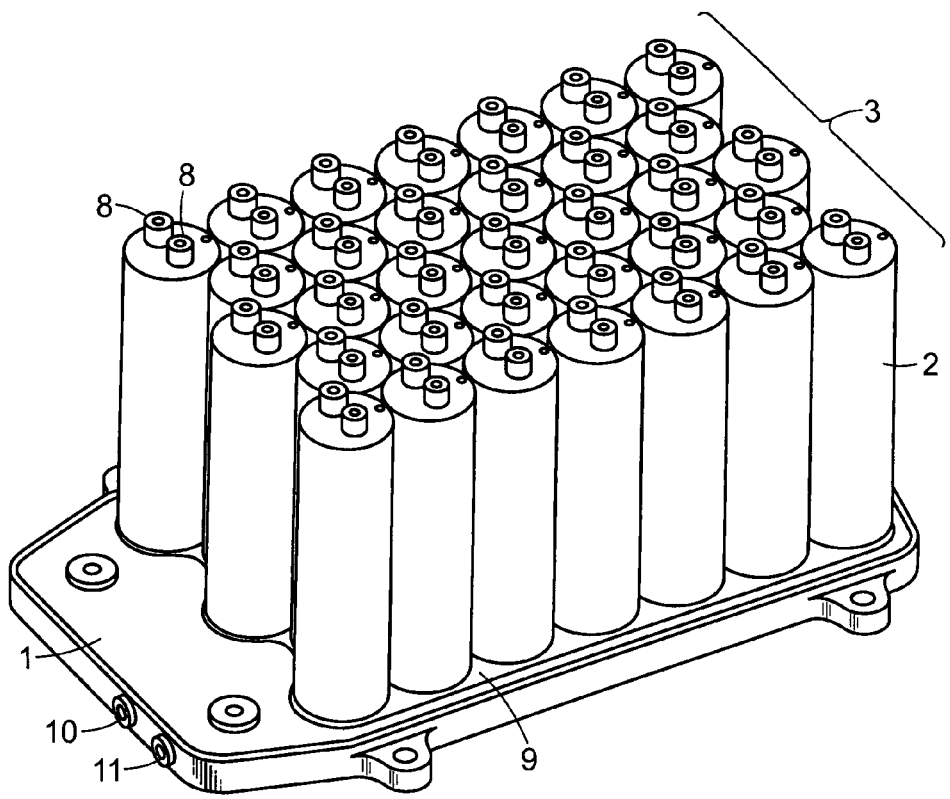
FIG. 1 shows an arrangement of the energy storage cells on the heat exchanger according to invention
Figure 2:
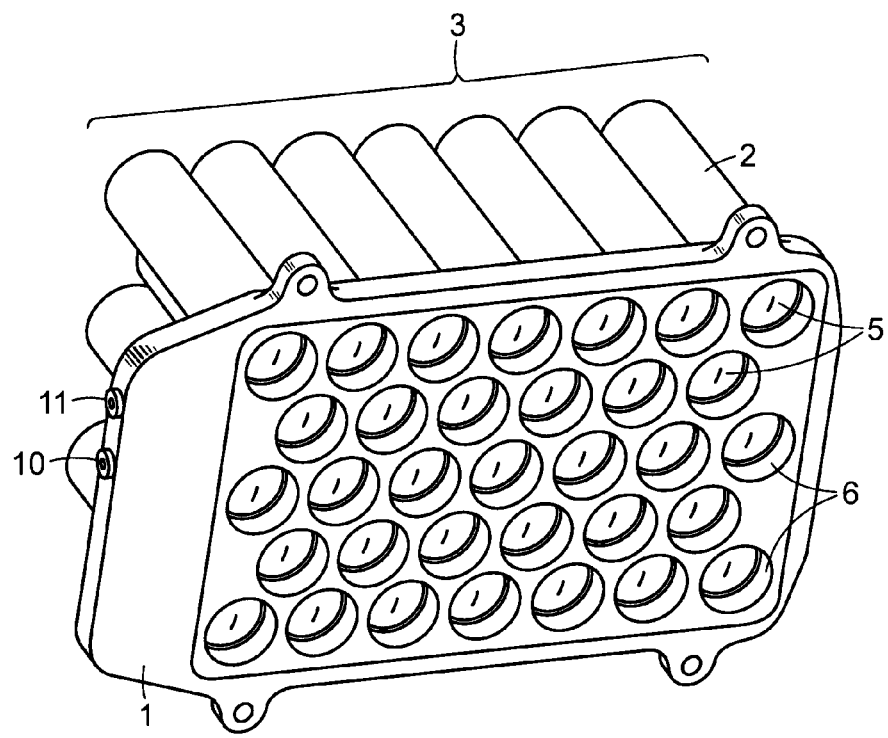
FIG. 2 shows an arrangement according to FIG. 1 with representation of the holes in the heat exchanger

FIG. 1 shows the arrangement of energy storage cells (2) on the heat exchanger according to invention (1). The energy storage cells (2) are fastened on the heat exchanger (1) and are connected to it in a heat-conducting manner. They are fastened on the side facing away from the electrodes (8), which comprise the safety pressure release valves (5) (FIG. 2). For supporting the fastening the heat exchanger (1) can comprise recesses (9), into which the energy storage cells (2) can be set in. This can go so far that the energy storage cells (2) can be inserted at least partially into holes shown in FIG. 2. The energy storage cells (2) can be arranged very tightly, as a heat exchanger lying between them can be omitted.

The heat exchanger (1) comprises an intake (10) and outlet (11) for supplying and dissipating a cooling agent, which dissipates the heat transferred from the energy storage cells (2) into the heat exchanger (1).

FIG. 2 shows the arrangement described in FIG. 1 from the bottom, so that the holes (6) in the heat exchanger (1) become visible. As it can be seen here well the safety pressure release valves (5) of the energy storage cells (2) are located directly above the holes (6), what allows the safety pressure release valves (5) to be in direct contact to the environment. In case of an outgassing of an energy storage cell (2) its safety pressure release valve (5) opens and dissipates the gases directly into the ambient air, without developing an overpressure inside the housing (4), which could cause an explosion in the extreme case. To avoid that ambient air reaches the interior of the housing (4) (see FIG. 4) via the holes (6), the diameter of the energy storage cell (2) is larger than the hole (6) and is placed such that the hole (6) is covered by the energy storage cell (2). To complete the sealing, sealing compound or seals can be attached from the outside or from the inside around the circumference of the energy storage elements. The sealant can be formed at the same time also by the sealing compound, by means of which the energy storage cells (2) are fastened on the heat exchanger (1).

Figure 3:
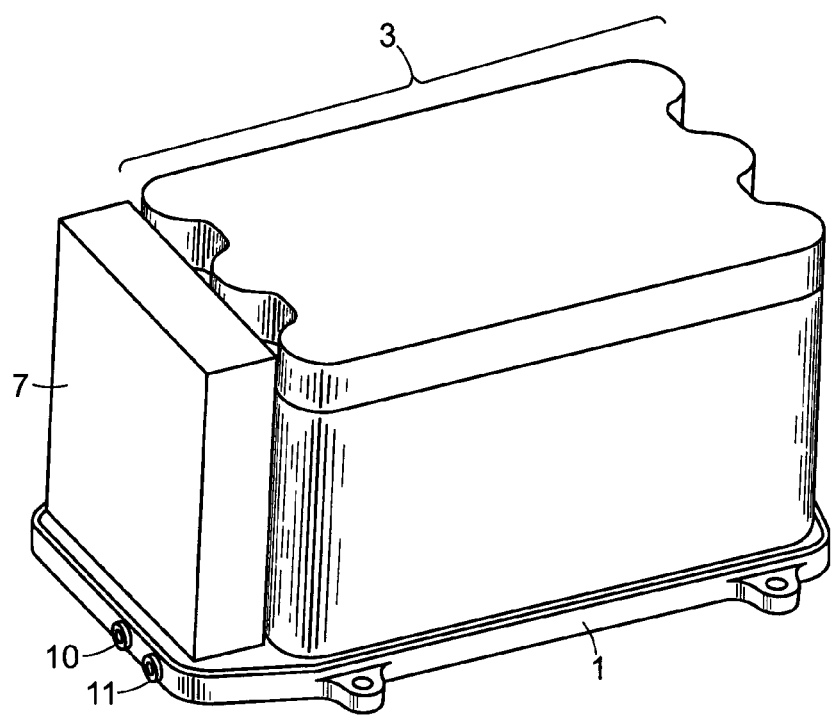
FIG. 3 shows an arrangement with an electronic module

Apart from the energy storage device (3), still another electronic module (7) is installed on the heat exchanger (1) in FIG. 3, what is reasonable to that effect that thereby the connections between the electronic module, which controls the energy flow of the energy storage device (3), and the energy storage device (3) are kept very short, what is beneficial to the electromagnetic compatibility.

Figure 4:
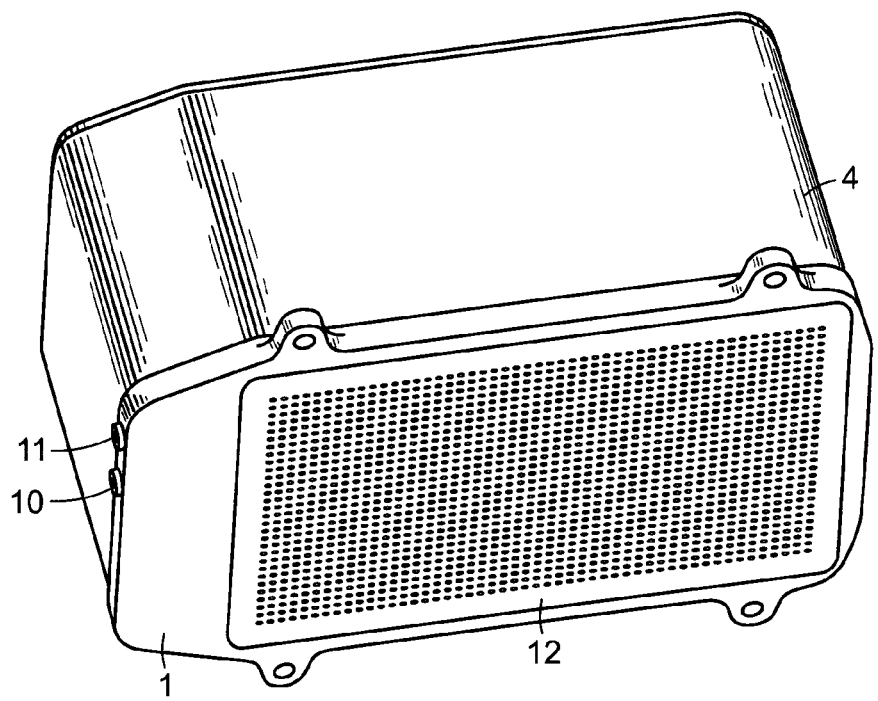
FIG. 4 shows a closed energy storage device

In FIG. 4 the entire energy storage module is shown, as it is built into the motor vehicle. The housing (4) covers both the electronic module (7) and the energy storage device (3) and can be fastened at the heat exchanger (1) by means of usual coupling technology, such as e.g. screwing, caulking, welding or gluing. It can be well recognized here that the heat exchanger (1) practically forms one side of the housing (4) and is formed also as a housing. For protecting the sensitive electronics against electromagnetic fields a sheet metal (12) with fine punched holes is attached at the outside of the heat exchanger (1) above the holes (6); simultaneously this sheet metal can serve also as a thermal shield.

LIST OF REFERENCE NUMERALS

1 Heat exchanger
2 Energy storage cell
3 Energy storage device
4 Housing
5 Safety pressure release valve
6 Holes
7 Electronic module
8 Electrodes
9 Recess
10 Intake
11 Outlet
12 Sheet metal

The invention claimed is:

1. A combination comprising a heat exchanger and an energy storage device having energy storage cells, wherein the heat exchanger is connected to at least one of the energy storage cells of the energy storage device in a heat-conducting manner, the energy storage device is enclosed by a housing, the energy storage cells have safety pressure releases for the release of gases to an outer environment, the heat exchanger at least partially forms at least one housing side of the housing, and the heat exchanger has holes that connect the safety pressure releases with the inviroment.

2. The combination according to claim 1, characterized in that the energy storage cells are fastened at the heat exchanger.

3. The combination according to claim 2, characterized in that the energy storage cells are fastened with a sealing compound, which improves thermal conductivity.

4. The combination according to claim 2, characterized in that the energy storage cells are fastened with an electrically insulating sealing compound.

5. The combination according to claim 1, characterized in that the safety pressure releases rest at the holes in the heat exchanger.

6. The combination according to claim 1, characterized in that an interior of the housing is sealed against the holes in the heat exchanger.

7. The combination according to claim 1, further comprising at least one electronic module connected in a heat-conducting manner to the heat exchanger.

8. The combination according to claim 7, characterized in that the electronic module is fastened in an interior of the housing at the heat exchanger.

9. The combination according to claim 1, further comprising air or at least one expanding gas or at least one liquid or a combination thereof as a cooling agent in said heat exchanger.

10. A combination comprising an energy storage device and a heat exchanger, wherein the energy storage device comprises energy storage cells enclosed in a housing, the heat exchanger forms at least part of a side of the housing and is thermally conductively connected to at least one of the energy storage cells, and the energy storage cells have safety pressure releases that communicate out of the housing through holes provided in the heat exchanger.

11. An arrangement comprising:
an energy storage device including at least one energy storage cell which respectively has at least one safety pressure release adapted to release gas from said respective energy storage cell to an outside environment; and
a housing in which said energy storage device is enclosed from said outside environment outside of said housing, wherein at least a portion of at least one side of said housing is formed by a heat exchanger that is thermally conductively connected to at least one said energy storage cell of said energy storage device, and wherein said heat exchanger has at least one hole that communicates said at least one safety pressure release with said outside environment.

12. The arrangement according to claim 11, wherein said at least one energy storage cell of said energy storage device is secured on said heat exchanger in a manner whereby said heat exchanger is thermally conductively connected to said at least one energy storage cell.

13. The arrangement according to claim 12, wherein said at least one energy storage cell is secured on said heat exchanger by a thermally conductive sealing compound.

14. The arrangement according to claim 12, wherein said at least one energy storage cell is secured on said heat exchanger by an electrically insulating sealing compound.

15. The arrangement according to claim 12, wherein each said energy storage cell has electrical discharge electrodes at a first end thereof and a respective said safety pressure release at a second end thereof opposite said first end, and wherein said second end of each said energy storage cell is secured to said heat exchanger.

16. The arrangement according to claim 11, wherein said heat exchanger has an inlet opening and an outlet opening adapted to flow a flowable cooling medium into and out of said heat exchanger.

17. The arrangement according to claim 11, further comprising a metal cover plate that covers an outer side of at least a portion of said heat exchanger and that has fine perforations communicating said at least one hole with said outside environment.

18. The arrangement according to claim 11, wherein said at least one safety pressure release comprises plural safety pressure releases, said at least one hole comprises plural holes, and said safety pressure releases are respectively aligned in registration with said holes.

19. The arrangement according to claim 11, wherein an interior of said housing is sealed from said at least one hole.

20. The arrangement according to claim 11, further comprising an electronics module arranged inside said housing and thermally conductively connected to said heat exchanger.

* * * * *